United States Patent [19]
Gutshall

[11] 3,788,185
[45] Jan. 29, 1974

[54] CONTROLLED-DRIVE SEALING FASTENER
[75] Inventor: Charles E. Gutshall, Schaumburg, Ill.
[73] Assignee: Elco Industries, Inc., Rockford, Ill.
[22] Filed: Feb. 1, 1972
[21] Appl. No.: 222,576

[52] U.S. Cl.................. 85/1 JP, 85/50 R, 151/38
[51] Int. Cl............................................ F16b 43/00
[58] Field of Search............. 85/1 JP, 50 R; 151/38; 277/166, 235 R

[56] References Cited
UNITED STATES PATENTS

| R27,085 | 3/1971 | Weidner | 85/1 JP |
|---|---|---|---|
| 2,439,516 | 4/1948 | Holcomb | 85/50 R |
| 3,298,270 | 1/1967 | Launay | 85/50 R |
| 3,606,357 | 9/1971 | Yonkers | 277/166 |
| 3,452,636 | 7/1969 | Cohen et al. | 277/166 |

FOREIGN PATENTS OR APPLICATIONS
| 670,652 | 10/1964 | Italy | 85/1 JP |

Primary Examiner—Edward C. Allen
Attorney, Agent, or Firm—Neuman, Williams, Anderson & Olson

[57] ABSTRACT

This controlled-drive fastener which seals the aperture through which it is driven comprises an elongated shank having an entering end portion at one extremity, a head of expanded cross section integral with the shank adjacent the other extremity, a centrally-apertured, substantially-rigid backing member or washer assembled on the shank adjacent the head and a centrally-apertured, substantially-resilient sealing member or washer assembled on the shank adjacent the substantially-rigid washer. The substantially-rigid washer has an annular convex portion intermediate the radial peripheries and disposed generally towards the head and a complementary annular concave portion disposed generally towards the entering end portion. The substantially-resilient washer is dilated adjacent the inner periphery to accommodate the fastener shank and to impart an inverted frustoconical configuration to the washer. Specific embodiments include self-centering designs, bonded assemblies, and swiveling assemblies.

14 Claims, 15 Drawing Figures

PATENTED JAN 29 1974 3,788,185
SHEET 1 OF 3
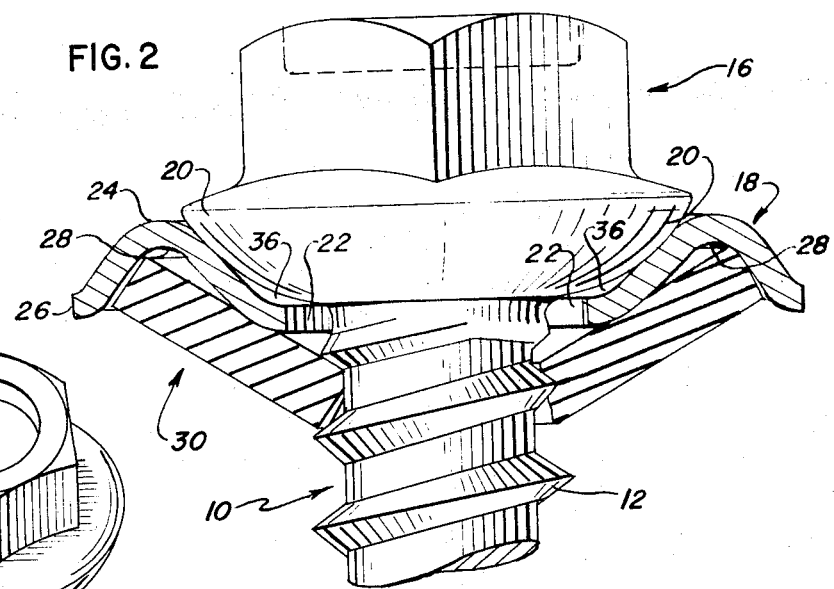
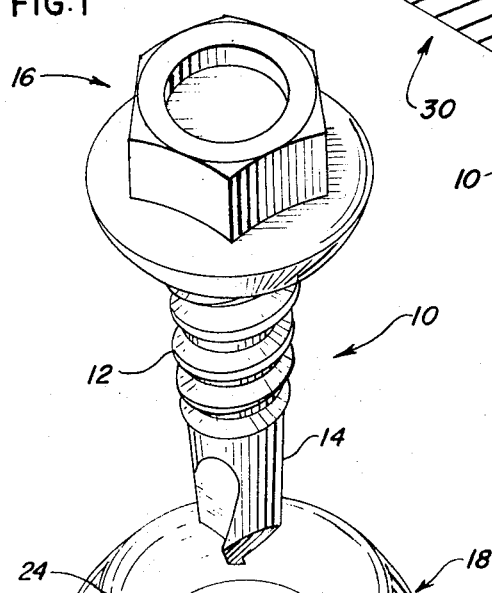
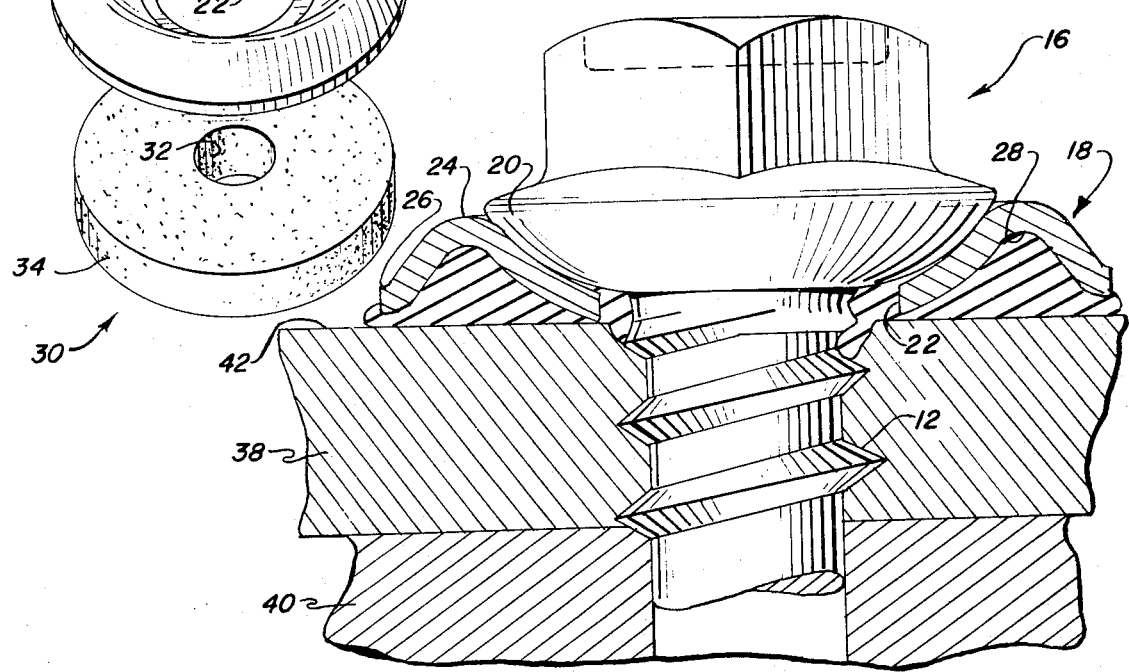

CONTROLLED-DRIVE SEALING FASTENER

BACKGROUND OF THE INVENTION

1. Field of the Invention

This invention relates to fasteners, such as threaded screws and bolts, and sealing washers employed therewith. More specifically, it relates to a controlled-drive fastener and improved washer combination employing a resilient sealing material, which combination seals the hole in the workpiece through which the fastneer penetrates while preventing overflattening of the resilient sealant.

While the present invention will be described with particular reference to controlled-drive sealing screws for fastening metallic sheets and the like, it should be understood that the invention is not limited thereto. The concepts set forth herein can be readily adapted for use in connection with other fasteners such as nails, rivets, power-driven pins, bolts and the like for various fastening functions, as those skilled in the art will recognize in the light of the present disclosure.

2. Description of the Prior Art

The art relating to sealing washers is highly developed because the need has long existed for fasteners which will effectively seal the hole through which they penetrate and maintain that seal over the life of the fastened structure. The most common type of sealing washer developed consists of a stiff backing member and a resilient sealing member in juxtaposed or bonded relationship on the fastener shank.

Typical of the prior art are the resilient washer assemblies disclosed, for example, in U.S. Pat. Nos. 2,339,549, 2,706,656, 2,761,347, 2,927,495, 2,982,573, 3,168,321, 3,202,033, and 3,286,577. A prevalent problem with sealing washers is that excessive pressure causes overflattening of the resilient sealant. This is deleterious to the sealing function and often results in a non-uniform appearance among fasteners because of different degrees of overflattening. It also may cause the washer to collapse in the vicinity of the hole and become concave, thus forcing the sealant to flow away from the hole where it is most needed.

The solution to such problems proposed, for example, in the aforementioned U.S. Pat. No. 3,286,577 comprises a rigid backing member and resilient sealing member of complementary design, which are preassembled and bonded in a fixed relationship to form a unitary structure. When the fastener is tightened, the rubber sealant is displaced until the rigid backing member abuts the workpiece to prevent further sealant displacement and achieve uniformity. Virtual metal-to-metal contact between the components and workpiece results, whereby solid tightening and minimum loosening from set or permanent deformation of the sealant is achieved.

While basically sound in theory and reasonably satisfactory in practice, it must be preassembled and prebonded with attendant cost, lacks versatility and otherwise has shortcomings. For example, the bonded rigid backing member and resilient sealing member are specifically designed to be employed together. The sealing member cannot be employed in connection with different types of backing members. different problems or applications often require completely new designs and assemblies. The component costs are substantial.

These same problems are encountered with certain other prior art devices. In addition, certain prior art devices are costly to manufacture; lack simplicity and ease of assembly and use; are limited in their applications, e.g., fastening flat surfaces only; provide inadequate, discontinuous or limited-life sealing, or otherwise lack the advantages of the present invention, as are pointed up in the following objects.

OBJECTS OF THE INVENTION

It is therefore a general object of the present invention to provide a low-cost, versatile, controlled drive sealing washer which will seal the hole through which it penetrates and in so doing will prevent overflattening of the resilient sealant. It is another general object to provide a simple, non-bonded, non-preassembled controlled-drive sealing washer which provides uniform appearance from one driven fastener to the next and results in a fastened joint which can be solidly tightened with minimum loosening from set or permanent deformation of the resilient member.

It is a specific object to provide a controlled-drive sealing washer which preferentially seals the hole first and then the surrounding area progressively thereafter. It is another object to provide a composite rigid-resilient sealing washer which forms a continuous seal with the workpiece from beyond the outer periphery of the rigid member to and including the shank portion which penetrates the workpiece.

It is another specific object to provide a controlled-drive sealing washer wherein the resilient member may be employed with a variety of rigid backing members to obtain specific characteristics. It is another specific object to provide a controlled-drive sealing washer which may optionally be prebonded prior to assembly or separately assembled on the fastener shank.

It is another specific object to prvide a controlled-drive sealing washer which copes with the problem of loosening due to set or permanent deformation of the resilient member. It is another specific object to provide a controlled-drive sealing washer which lends itself to self-centering embodiments and embodiments which may be used on angular surfaces.

It is still another specific object to provide a controlled-drive sealing fastener having embodiments which provide uniform "clutch-out" properties when power-driven, whereby a uniform appearance is achieved. It is still another specific object to provide a controlled-drive sealing washer wherein the resilient member retains the assembly in position on the fastener shank, and the assembly can be bonded together in situ if desired.

These and other objects of the invention will become apparent as the detailed description proceeds.

SUMMARY OF THE INVENTION

These objects are achieved by a fastener comprising an elongated shank with entering end at one extremity and a head at the other extremity, a complementarily-designed, centrally-apertured, substantially-rigid backing member or washer and a separate, centrally-apertured, substantially-resilient sealing member of sealant washer. The substantially-rigid washer is disposed on the shank adjacent to or abutting the head and extending radially beyond the head. The substantially-resilient washer is disposed on the shank abutting the substantially-rigid washer but on the entering end side thereof.

The shank with entering end portion and head may be integrally fabricated from conventional materials, e.g., metals such as steel, stainless steel, aluminum, brass, or the like. The substantially-rigid washer may comprise almost any economically-feasible material which can be fabricated in the desired shape and has the requisite strength and rigidity for the particular application, e.g., conventional metals, such as steel, stainless steel, brass, or aluminum; rigid plastics, such as fiber-glass-reinforced plastics, phenolic resins including Bakelite; and equivalents.

As will be apparent from the drawings, the substantially-rigid washer has at least an annular convex portion intermediate the radial peripheries thereof and disposed generally towards the head. It also has at least a complementary concave portion or annular pocket disposed generally towards the entering end.

The sealant washer is assembled on the shank adjacent the substantially-rigid washer and normally within the radial confines thereof prior to tightening of the fastener. It may be fabricated from any suitable rubber-like material, such as natural rubber, synthetic rubber, neoprene, elastomers or any other material having suitable resilient or compressible properties for providing the requisite sealing and other functions desired herein. In certain embodiments, various plastics may be employed, e.g., polyolefins such as polyethylene, polypropylene, which may be blown to achieve softness; vinyl plastisols, etc.

The terms "rigid" or "substantially-rigid" and "resilient" or "substantially-resilient" as used herein are relative, those skilled in the art recognizing that a rigid material may have some resilience and a resilient material may have some rigidity. Functionally, the rigid washer of the present invention has sufficient rigidity to cause the resilient washer to deform and flow to fill voids and form seals without significant deformation or excessive deflection of the rigid washer, although some resilient deflection is desirable to offset any set of the resilient washer. Thus the materials of the two washers should be coordinated to achieve such results. Those skilled in the art may select suitable materials in the light of this disclosure, particularly the examples of suitable materials set forth herein and the desired end results as portrayed, for example, in the drawings.

In a low-cost embodiment of the present invention, the sealant washer prior to assembly is a flat-sided, right-circular cylinder, which may be economically punched from flat stock. The periphery of the aperture is smaller than that of the shank where by the periphery of the aperture is stretched to resiliently grip the shank frictionally upon being assembled thereon.

Since the radially-outer portions of the sealant washer are relatively unstretched prior to tightening of the fastener, the resulting differential stresses between the stretched inner portion and the unstretched outer portion cause the resilient member to assume a frustoconical configuration, e.g., the conical sides being disposed at an angle of about 30° to 70° relative to the shank axis, preferably about 40° to 60°. In the practice of the present invention this configuration is inverted or concavely disposed relative to the substantially-rigid backing member and the head.

While the washer naturally assumes the frustoconical configuration and the desired disposition thereof upon being peripherally forced along the shank from the entering end towards the head, such disposition and the way it is achieved have very decided advantages. The sealant already resiliently grips the shank in sealing or incipient sealing engagement even before the fastener is tightened. When the fastener is tightened, the disposition of the sealant washer is such that the hole is preferentially sealed first and then the surrounding area.

This progressive sealing action avoids any possibility of an insufficiency of sealant material to form the critical inner seal. It obviates any possibility of the outer seal entrapping the sealant material so that it is unavailable to form the inner seal. It assures that any excess sealant can be expressed beyond the outer periphery of the substantially-rigid washer where it can't interfere with (and may enhance) the sealing function and the desired virtual metal-to-metal contact.

In the embodiments wherein the shank is threaded, the aperture in the substantially-rigid washer may be smaller than, the same as, or larger than, the maximum outer diameter of the threads, although it is normally larger than the shank adjacent the head to permit at least some limited movement. Where it is smaller than the thread diameter, it is in effect a "captive" washer. In the embodiment wherein the aperture is larger than the maximum outer thread diameter, the rigid member is nonetheless retained or "captured" on the shank by the sealant washer which resiliently grips the shank. This frictional fit prevents disassembly after manufacture, thus assuring a complete assembly when shipped, displayed, sold and used.

As best described in connection with the drawings, the undersurface of the head of the fastener may be designed to complement the curvature of the rigid backing member and thereby achieve desired characteristics. These include, for example, a swiveling effect for fastening to angular surfaces, a self-centering effect for centered uniformity, a configuration having enhanced "clutch-out" properties and the like.

BRIEF DESCRIPTION OF THE DRAWINGS

The present invention will be more clearly understood from the following detailed description of specific embodiments read in conjunction with the accompanying drawings, wherein:

FIG. 1 is an exploded perspective view of the elements making up the controlled-drive sealing fastener assembly of the present invention;

FIG. 2 is a fragmentary plan view, partially in section, showing the elements of FIG. 1 assembled as comtemplated by the present invention;

FIG. 3 shows the fastener of FIG. 2 after being tightened to hold two sheets of a workpiece in place.

Figure 4:
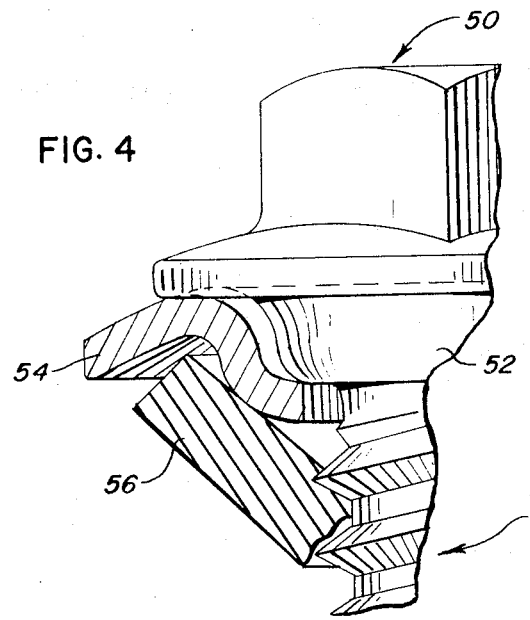
FIGS. 4 through 15 are fragmentary plan views, partially in section, of various alternative embodiments of the fastener of the present invention.

It should be understood that the drawings are not necessarily to scale and that the embodiments are illustrated by graphic symbols, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS, INCLUDING PREFERRED EMBODIMENTS

Referring to FIGS. 1, 2 and 3, the controlled-drive sealing fastener comprises elongated shank 10 having threads 12 on at least a portion thereof and an entering end 14 at one extremity. A head 16 of expanded cross section and integral with shank 10 is disposed adjacent the other extremity thereof.

A centrally-apertured, substantially-rigid washer 18 is assembled on the shank adjacent to and abutting the undersurface 20 of head 16. The aperture defined by inner periphery 22 of rigid washer 18 is sufficient in size to accommodate shank 10, at least adjacent the head but insufficient to pass head 20 itself.

Rigid washer 18 has an annular convex portion 24 between inner periphery 22 and outer periphery 26. As is apparent in FIGS. 2 and 3, there is a complementary annular concave portion 28 disposed generally towards the entering end 14. In practice, rigid washer 18 may be cold-formed from flat stock in the desired configuration. Thus the convex and concave portions result from a single cold-forming operation. In a preferred embodiment, rigid washer 18 is formed from 1010 cold-rolled steel in strip form.

The resilient sealant or washer 30 comprises a generally circular cylinder of rubber or rubber-like composition or equivalent having a central aperture defined by inner periphery 32. In a preferred embodiment, it may comprise neoprene synthetic rubber having a durometer of about 65-70. The outer periphery 34 in its non-dilated, non-assembled condition has a diameter roughly approximating the outer diameter of the rigid backing member 18.

The thickness and diameter of the resilent washer is selected so that sufficient resilient material is available to fill critical voids and provide the desired seals. In practice, a slight excess is desirable and this excess is expressed radially from beneath the rigid washer as the fastener is tightened. This aspect is facilitated by the inverted frustoconical disposition of the sealant washer which permits initial screw forces to seal the hole first and then the surrounding area progressively. The slight excess, as well as the intial non-contoured or neutral configuration of the resilient washer, provides a certain degree of flexibility whereby the same resilient washer may be employed with a variety of different rigid backing members.

The aperture defined by inner periphery 32 is sized so that when the resilient washer 30 is peripherally forced up along shank 10, the natural stresses force it into the aforementioned inverted frustoconical disposition shown in FIG. 2. In a specific embodiment it has been found that a rubber washer having an inner diameter of approximately ¼ inch will assume the desired frustoconical disposition when dilated sufficiently to be force-assembled on a 5/16-inch diameter screw. The angle is preferably in the range of about 30° to 70°, typically about 40° to 60°, relative to the axis of the shank.

The specific embodiment of FIGS. 1, 2 and 3 incorporate several desirable features which may be advantageously employed to cope with particular problems. For example, the undersurface 20 of head 16 has a generally convex configuration and the contacting inner surface of rigid washer 18 has a generally concave configuration. This imparts self-centering properties to the combination. In addition, the head and rigid washer act as a swievel similar to a ball joint which permits the fastener to be applied to angular surfaces. Still further, by combining the functional convex shoulder 20 into the head itself, a lower head profile is advantageously provided. These same features are present in the similar embodiments of FIGS. 13, 14 and 15 discussed hereinafter.

Another feature of the embodiment of FIGS. 1, 2 and 3 is the fact that convex undersurface 20 of head 16 and the concave or contacting portion of rigid washer 18 are deliberately mismatched whereby a space 36 adjacent the shank (FIG. 2) is provided. When the fastener is used to fasten a workpiece such as abutting sheets 38 and 40, resilient washer 30 is trapped between surface 42 of sheet 38 and rigid backing member 18. This forces a small amount of resilient washer 30 into the space between undersurface 20 and the adjacent surface of backing member 18. This assures a perfect seal, even where the convex or concave surfaces are not smooth or are out-of-round or are otherwise not in metal-to-metal sealing contact.

Referring to FIG. 4, head 50 has a shoulder 52 on the undersurface thereof which cooperates with rigid washer 54 to provide a solid stop to the displacement of resilient washer 56 when threaded shank 58 is screwed into a workpiece. Sealing washer 56 is a loose or unbonded, rubber or rubber-like washer. As in the embodiment of FIGS. 1-3, it assumes the desired inverted frustoconical configuration illustrated as the result of dilating the inner periphery of the aperture to fit over threaded shank 58.

Figure 5:
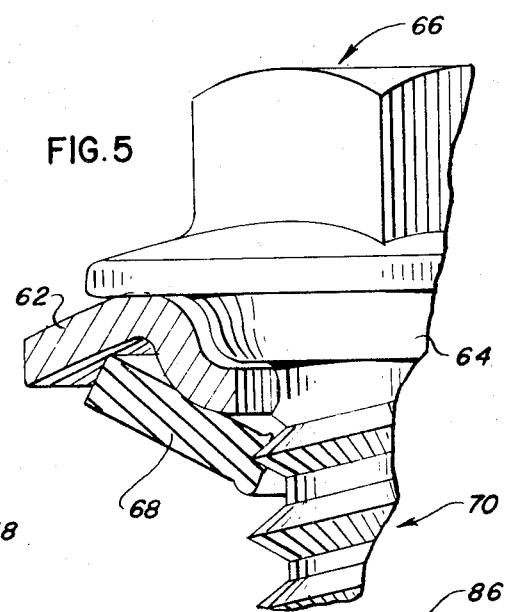

The embodiment of FIG. 5 is very similar to that of FIG. 4 except for minor structural changes. For example, metal backing member 62 has more of a conical or cupped periphery to reduce the volume of sealant necessary to perform the sealing function. Shoulder 64 of head 66 has been diminished in size to conform to the new washer configuration. As a result, resilient washer 68 is fabricated from thinner stock. As previously indicated, however, the unique fastener is so designed that the dimensions of the resilient washer are not critical so long as the inner diameter is sized to obtain upon assembly the desired inverted frustoconical configuration and sufficient material is present to obtain the desired seals. Threaded shank 70 may be identical to that of other embodiments.

Figure 6:
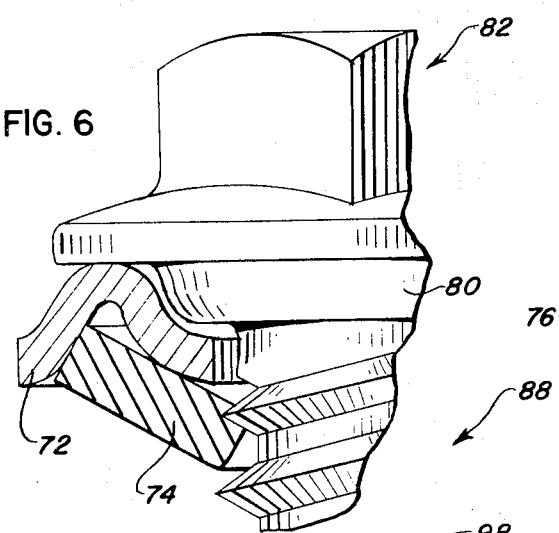
Figure 7:
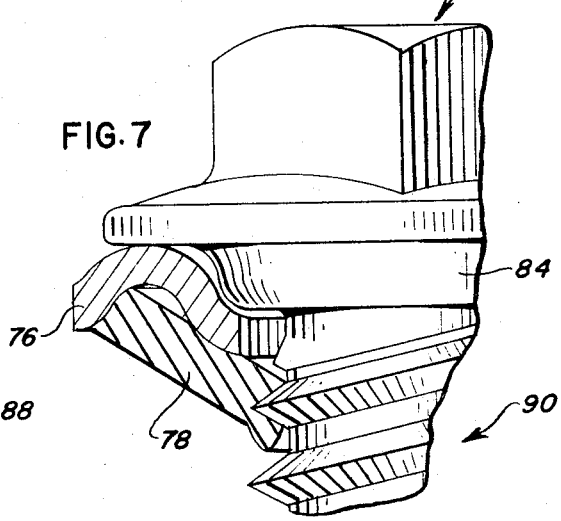

The embodiments of FIGS. 6 and 7 are configured so that they present the appearance of a bonded washer. In FIG. 6 rigid washer 72 is sized and configured so that the inner surface thereof contacts the outer periphery of rubber sealing member 74 and is disposed substantially perpendicular to the angle thereof. Likewise in FIG. 7 rigid washer 76 contacts the periphery of sealing washer 78, and the contacting portion is substantially perpendicular thereto.

Another common feature of the embodiments of FIGS. 6 and 7 is the fact that the metal washers 72 and 76 are not flat or horizontal about the aperture, but instead are of inverted conical shape. Thus, when shoulder 80 of head 82 and shoulder 84 of head 86 contact rigid washers 72 and 76, respectively, the portion of the metal washer adjacent the contacting area bends slightly, introducing another valuable fastening asset—integral spring characteristics which offset any set or permanent rubber deformation. Threaded shanks 88 and 90 of the respective fasteners may be identical.

Figure 8:
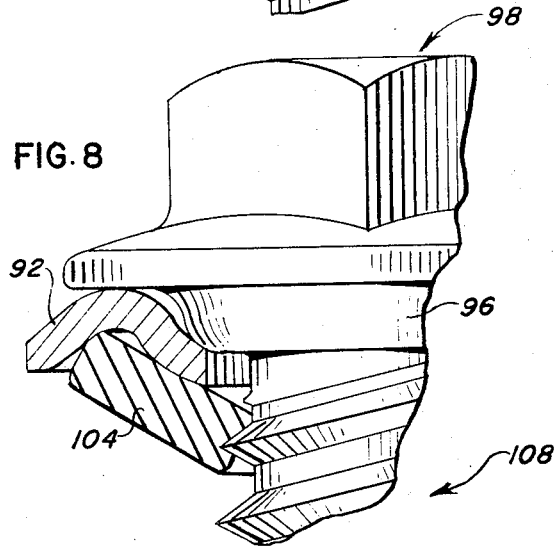
Figure 9:
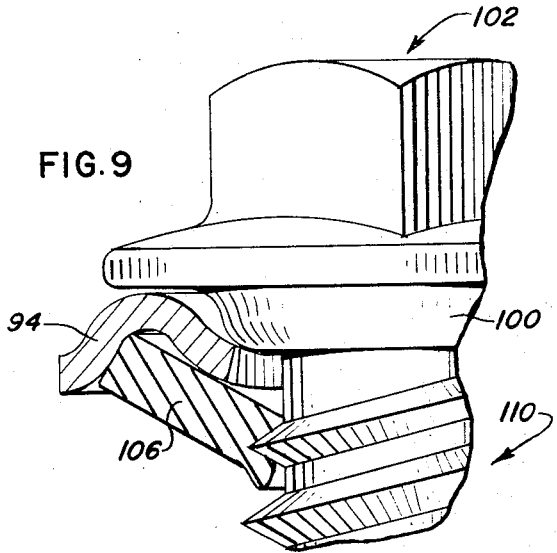

The embodiments of FIGS. 8 and 9 are similar to those of FIGS. 6 and 7 except that metal washers 92 and 94 have substantially no curvature which conforms to shoulder 96 of head 98 or shoulder 100 of head 102, respectively. Thus, when the fasteners of FIGS. 8 and 9 are threaded into a workpiece surface and tightened, shoulders 96 and 100 must reform the metal washers into shapes similar to those of FIGS. 4 and 5. The assemblies, however, have excellent self-centering characteristics, that is, the respective washers will center themselves about the shoulders for a concentric appearance. The integral spring characteristics are even superior to those of FIGS. 6 and 7. Resilient washers 104 and 106 and threaded shanks 108 and 110 may be identical to those of the embodiments of FIGS. 1–7.

A comparison of the embodiment of FIGS. 1–3 with the embodiments of FIGS. 4–9 reveals that in the latter embodiments, the metal washer is trapped by the threads on the threaded shanks. This is the result of rolling the threads on the shank subsequent to assembling the washer thereon, the outer diameter of the threads being greater than the diameter of the aperture of the washer so that the washer cannot be removed.

In contrast, the embodiments of FIGS. 10–15 are similar to that of FIGS. 1–3 in that they are slipover assemblies. Thus, the metal washers have larger holes and will slip over the completed threads in a final assembly operation. In these embodiments the resilient washer performs the additional function of preventing disassembly.

Figure 10:
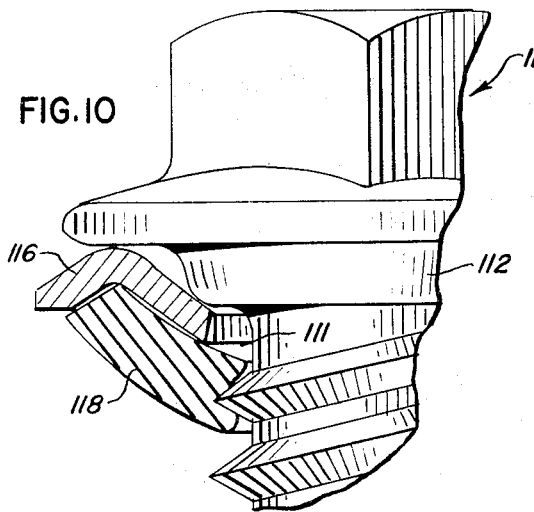

In each of the slipover embodiments, a substantial gap exists between the inner periphery and the fastener shank. In FIG. 10 this gap in indicated by reference numeral 111. Because this gap is large, some centering characteristics should be incorporated into the slipover embodiments, e.g., a tapered or countersunk rigid washer configuration, which complements the shoulder of the fastener head.

In FIG. 10, shoulder 112 of head 114 centers metal washer 116. The inner surface of metal washer 116 also conforms to the contacting surface of resilient washer 118. The net effect is that the metal washer provides additional weather protection for the resilient washer 118.

Figure 11:
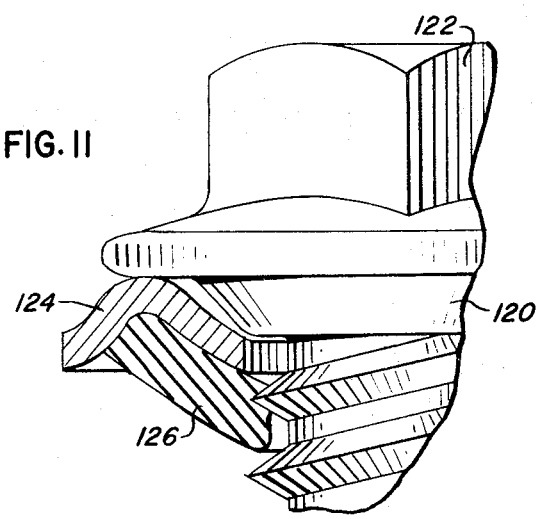

In FIG. 11, shoulder 120 of head 122 matches the adjacent configuration of metal washer 124. This imparts a more solid integral fastened relationship which is very strong and would permit thinner metal washers. Resilient washer 126 is substantially the same as that in FIG. 10.

Figure 12:
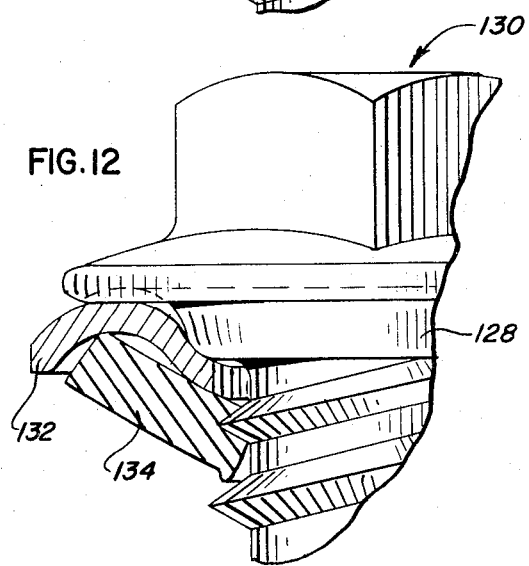

In FIG. 12, shoulder 128 of head 130 blends into a peripheral undercut on the undersurface of the head flange. The undercut portion is designed to match exactly the contour of the metal washer 132 after it is deflected and tightened. This offers a sudden matching of metal-to-metal surfaces, which in turn would raise the torque requirements of a rotative power driver. This results in a desired "clutch-out" of the driver, resulting in turn in added consistency of function and appearance, particularly with respect to the amount of sealant washer which is expressed beyond the periphery of steel washer 132. This embodiment also has satisfactory spring characteristics.

Figure 13:
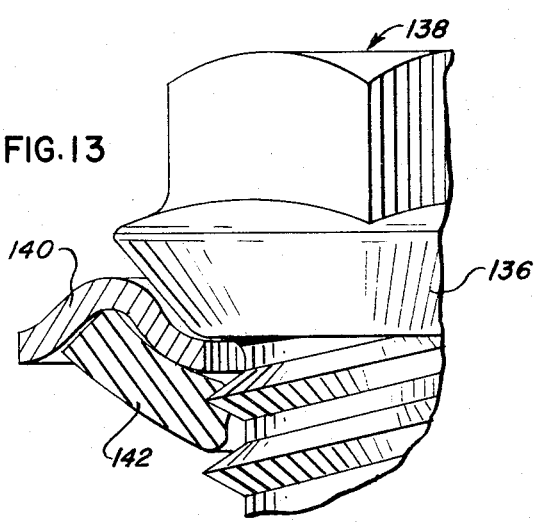
Figure 14:
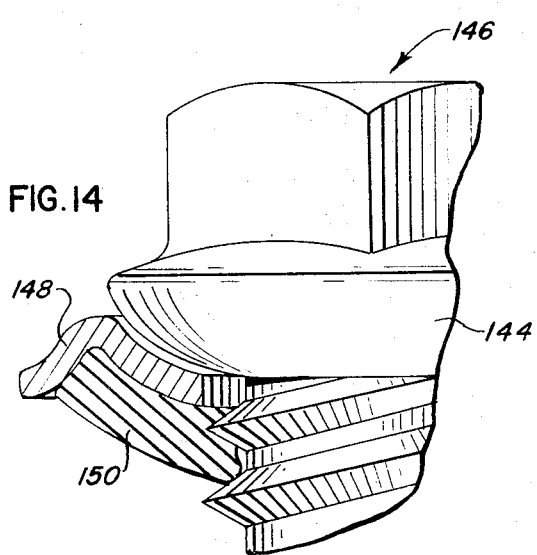
Figure 15:
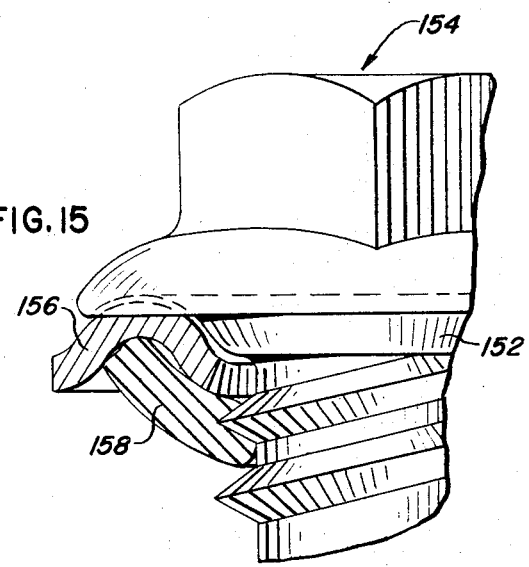

The embodiments of FIGS. 13, 14 and 15 represent variations on the swivel or ball joint concepts already illustrated in connection with the embodiments of FIGS. 1–3. Thus, in FIG. 13 the inverted frustoconical undersurface 136 of head 138 combines with adjacent concave portions of metal washer 140 to provide a self-adjusting relationship. Thus the head centers the washer, and the axes of the washer and shank adjust to one another to accommodate the work-piece surface. As aforementioned, this permits the fastener to be employed on angular surfaces. Sealant washer 142 may be identical to that employed in many other embodiments.

In FIG. 14 the convex undersurface 144 of head 146 substantially corresponds to the concave portion of metallic washer 148. This embodiment is very similar to that of FIGS. 1–3 except that there is no deliberate mismatch of the convex and concave surfaces. This embodiment provides self-centering characteristics as well as the ability to swivel to adjust to angular surfaces. In addition, its "clutch-out" characteristics are very satisfactory. The sealant washer 150 may be identical to that employed in other embodiments.

In FIG. 15 the undersurface including shoulder 152 of head 154 is undercut in a generally concave configuration which matches the adjacent annular convex portion of rigid washer 156. This also provides the desired swiveling effect, excellent self-centering characteristics and satisfactory "clutch-out" properties. Again, resilient member 158 may be substantially as in the other embodiments.

It should be noted that all embodiments have an entrance opening either above the aperture or the periphery of the sealing washer to permit entry of a liquid bonding agent so that by adhesive means the assembly may be permanently bonded, should this feature be desired. The parts could be dipped into a bonding agent and the excess spun off, leaving a sufficient quantity trapped between the elements of the assembly to provide a bond.

If desired, the metallic washer and resilient washer may be bonded together prior to assembly on the fastener shank. This could be accomplished by employing an adhesive or heat or by molding the resilient member to the rigid member, where practicable. These and alternate techniques and conditions for employing the same will be apparent to those skilled in such arts in the light of this disclosure.

From the above description it is apparent that the objects of the present invention have been achieved. While only certain embodiments have been set forth, alternate embodiments and various modifications will be apparent from the above description to those skilled in the art. These and other alternatives are considered equivalents and within the spirit and scope of the present invention.

Having described the invention, what is claimed is:

1. A controlled-drive sealing fastener comprising in combination:

a an elongated shank having an entering end at one extremity;

b a head of expanded cross section integral with said shank adjacent the other extremity;

c a centrally-apertured, substantially-rigid washer assembled on the shank adjacent to, and extending at least to the radial extremity of, said head, the aperture being sufficient in size to accommodate the shank adjacent the head but insufficient to pass the head, said washer having at least an annular convex portion intermediate the radial peripheries thereof and disposed generally towards the head and a complementary annular concave portion disposed generally towards the entering end;

d a centrally-apertured, non-metallic substantially-resilient washer of generally uniform thickness assembled on said shank adjacent said substantially-rigid washer and within the radial confines thereof prior to tightening of said fastener, said substantially-resilient washer being independent of said substantially-rigid washer at least as originally assembled on said shank, the periphery of the aperture of said substantially-resilient washer being stretched to resiliently grip said shank, outer portions of said substantially-resilient washer being relatively unstretched prior to tightening of said fastener, the resulting differential stresses holding the washer in an inverted generally frusto-conical configuration relative to said substantially-rigid washer and said head;

said substantially-resilient washer thus being disposed to sealingly engage said shank, said substantially-rigid washer and an underlying workpiece surface upon tightening of the fastener thereagainst.

2. The controlled-drive fastener of claim 1 wherein the aperture of said substantially-rigid washer will pass said shank throughout its length and said substantially-rigid washer is held in place adjacent said head prior to tightening the fastener by said substantially resilient washer.

3. The controlled-drive sealing fastener of claim 1 wherein said elongated shank is threaded at least along a portion thereof.

4. The controlled-drive sealing washer of claim 1 wherein said substantially-rigid washer comprises steel and said substantially-resilient washer comprises rubber.

5. The controlled-drive sealing fastener of claim 1 wherein inner margins of said substantially-rigid washer are curved towards said shank.

6. The controlled-drive sealing washer of claim 1 wherein outer margins of said substantially-rigid washer are curved away from said shank.

7. The controlled-drive sealing washer of claim 1 wherein said substantially-rigid washer is fabricated from cold-rolled steel and said substantially-resilient washer is fabricated from neoprene synthetic rubber.

8. The controlled-drive sealing fastener of claim 1 wherein prior to tightening of said fastener the angle of the frustoconical configuration relative to the shank axis is about 30° to 70°.

9. The controlled-drive sealing fastener of claim 1 wherein said substantially-rigid and substantially resilient washers are independent of one another prior to tightening of said fastener.

10. The controlled-drive sealing fastener of claim 1 wherein the undersurface of said head and the contacting surface of said substantially-rigid washer are complementarily curved so as to provide self-centering characteristics to the assembly upon tightening of the fastener.

11. The controlled-drive sealing washer of claim 1 wherein the undersurface of said head and the contacting portion of said substantially-rigid washer have a complementary convex-concave relationship whereby the head and washer swivel to permit the fastener to be employed on angular surfaces.

12. The controlled-drive sealing washer of claim 11 wherein the complementary concave and convex surfaces are mismatched to leave a gap therebetween adjacent the shank whereby resilient material is forced into the gap upon tightening of the fastener.

13. A controlled-drive sealing fastener comprising in combination:

a an elongated threaded shank having an entering end at one extremity;

b a head of expanded cross section integral with said shank adjacent the other extremity and having a generally convex undersurface;

c a centrally-apertured, substantially-rigid washer assembled on the shank adjacentt to, and extending radially beyond, said head, the aperture being sufficient in size to accommodate the shank adjacent the head but insufficient to pass said head, said washer having an annular convex portion intermediate the radial peripheries thereof and disposed generally towards said head and a complementary annular concave portion disposed generally towards said entering end, inner head-side portions also being concavely curved to complement the contacting convex undersurface of said head;

d a centrally-apertured, non-metallic substantially-resilient washer of generally uniform thickness assembled on said shank adjacent said substantially-rigid washer and within the radial confines thereof prior to tightening of said fastener, the periphery of the aperture of said sub-stantially-resilient washer being stretched to resiliently grip said shank, said substantially-resilient washer being independent of said substantially-rigid washer at least as originally assembled on said shank, outer portions of said substantially-resilient washer being relatively unstretched prior to tightening of said fastener, the resulting differential stresses holding the washer in an inverted generally frusto-conical configuration relative to said substantially-rigid washer and said head, the conical sides being disposed at an angle of about 30° to 70° relative to the axis of the shank;

said substantailly-resilient washer thus being disposed to sealingly engage said shank, said substantially-rigid washer and an underlying workpiece surface upon tightening of the fastener thereagainst.

14. The controlled-drive sealing fastener of claim 13 wherein the convex undersurfaces of said head and the complementary concave surface on inner head-side portions of said substantially-rigid washer are mismatched to leave a gap therebetween adjacent the shank whereby resilient material is forced into the gap upon tightening of the fastener.

* * * * *